United States Patent [19]

Mahr

[11] 4,374,898

[45] Feb. 22, 1983

[54] ELASTOMERIC FILM

[75] Inventor: Tibor G. Mahr, Wilmington, Del.

[73] Assignee: E. I. Du Pont de Nemours and Company, Wilmington, Del.

[21] Appl. No.: 278,435

[22] Filed: Jun. 25, 1981

[51] Int. Cl.$^3$ .......................... B05D 3/06; B32B 9/04; B32B 13/12
[52] U.S. Cl. .................................... 428/447; 427/35; 427/189; 427/190; 427/322; 428/451; 428/688; 428/689; 427/419.1
[58] Field of Search ................... 427/35, 36, 190, 189, 427/322, 372.2, 397.7, 419.1; 428/447, 451, 688, 689

[56] References Cited

U.S. PATENT DOCUMENTS

| | | | |
|---|---|---|---|
| 3,398,044 | 8/1968 | Plueddemann | 428/465 X |
| 3,660,134 | 5/1972 | Morris et al. | 106/308 Q |
| 3,809,671 | 5/1974 | Okawa et al. | 260/41 R |
| 4,082,877 | 4/1978 | Shadle | 428/35 |
| 4,094,853 | 6/1978 | Monte et al. | 260/40 R |
| 4,180,490 | 12/1979 | Maclean | 260/23 R |

Primary Examiner—Michael R. Lusignan

[57] ABSTRACT

Ethylene/vinyl acetate copolymer film containing 35 to 50 percent copolymerized vinyl acetate by weight is irradiated with 0.5 to 16 megarads of high energy radiation, contacted with an alcoholic solution of a titanate or silane coupling agent, and subsequently contacted with an alcoholic finely divided mineral particulate slurry. The resulting film is elastomeric, heat sealable, transparent upon relaxation after being stretched and free of surface tack.

4 Claims, No Drawings

ELASTOMERIC FILM

BACKGROUND OF THE INVENTION

The subject invention relates to the treatment of elastomeric copolymer films with a combination of crosslinking and surface treatments to obtain a product which will retain its transparency upon relaxation after being stretched, be free of surface tack, and display acceptable heat sealability. Such a product may be used for packaging both food and nonfood items.

The development of copolymer films useful in the packaging industry has been an active area of experimentation for many years. Currently, there are two general types of films used for packaging purposes. The first is heat-shrinkable film which, due to the temperature required to shrink-wrap such a film around a product, is undesirable for most fruit and vegetable packaging, as well as heat-sensitive nonfood packaging. The second is stretch film such as polyvinylidene chloride which lacks elastomeric properties and hence is not as desirable for packaging as are films which display more acceptable levels of elastic recovery. The object of this invention, therefore, is to provide a process whereby an elastomeric copolymer film can be treated so as to be free of surface tack, transparent upon relaxation after being stretched and heat sealable.

It is known that crosslinking elastomeric film such as ethylene/vinyl acetate copolymer (hereinafter EVA), containing about 35-50 percent copolymerized vinyl acetate by weight, by exposure to high energy ionizing radiation, results in a film with enhanced form stability, i.e., creep resistance. This crosslinking can be achieved by exposure to high energy radiation such as electrons, X-rays, gamma rays, etc., a dosage of such irradiation being measured in "rads" wherein one rad is the absorbed dose of ionizing radiation equal to an energy of 100 ergs per gram of irradiated material. A megarad (MR) is equal to one million rads. Crosslinked EVA with high vinyl acetate content (greater than 30 percent), however, is not satisfactory for stretchable film packaging due to excess surface tack which creates handling problems both in production windup and machine packaging applications.

SUMMARY OF THE INVENTION

It has been discovered that the surface tack associated with EVA film containing 35-50 percent copolymerized vinyl acetate (all concentrations herein being by weight percent) can be eliminated by the attachment of finely divided mineral particulates to the surface of the film with the aid of certain coupling agents. When proper conditions are chosen, the film will retain its heat sealability and elastic recovery and will remain transparent upon relaxation after being stretched.

Generally speaking, the surface treatment of the subject invention comprises providing an EVA film containing 35 to 50 percent copolymerized vinyl acetate by weight, said film being crosslinked as a result of being subjected to a 0.5 to 16 megarad dosage of high energy radiation. This crosslinked film is contacted with an alcoholic solution containing at least about 0.2 percent of a coupling agent selected from the group consisting of titanate and silane coupling agents so that the coupling agent is bonded to the surface of the film. The film is then contacted with a slurry of at least 0.2 percent finely divided mineral particulates in alcohol so that the mineral particulates are attached to the coupling agent molecules already present on the film surface. The resulting EVA film is elastomeric, heat sealable, transparent upon relaxation after being stretched and free of surface tack.

DETAILED DESCRIPTION OF THE INVENTION

EVA containing about 35-50 percent polymerized vinyl acetate by weight is irradiated with a dosage of 0.5 to 16 MR radiation. This irradiation can of course be applied to the EVA after film formation, which is preferable, or a portion of the irradiaton can be applied to the EVA before extrusion into film form, the only practical limitation being that if too much irradiation is carried out prior to film formation, the EVA will not be extrudable. With such a limitation in mind, the total irradiation dosage must be within the above stated range, i.e., 0.5 to 16 MR. Such irradiation induces the desired amount of crosslinking of the copolymer, resulting in an elastomeric film with enhanced form stability, attainment of greater than 85 percent elastic recovery after 200 percent elongation and impact strength suitable for stretching said film over and around a food or a nonfood product. As mentioned above, this irradiation can be carried out by any of a number of conventional radiation techniques.

To remove the surface tack common to crosslinked EVA film containing greater than 30 percent copolymerized vinyl acetate, the film is surface treated with the sequential steps of first attaching either a titanate or silane coupling agent to the surface of the film and second, attaching a finely divided mineral particulate to the coupling agent. It is well to note that simply adding the mineral particulate to the surface of the film without the use of a suitable coupling agent will not result in a film with the desired physical properties. That is, in order to remove the surface tack associated with crosslinked EVA film containing greater than 30 percent copolymerized vinyl acetate using only mineral particulates, a very high concentration of minerals on the film surface is required. Such a surface treatment amounts to nothing more than dusting the surface of the film, resulting in an opaque film undesirable for most food and nonfood packaging. Without a coupling agent, the mineral simply sticks on the film surface and can be removed with a slight water washing. With the use of a properly chosen coupling agent, the film can be contacted with a dilute mineral slurry, thereby attaching the minerals to the coupling agents, resulting in a film which is not only tack free but retains its transparency upon relaxation after being stretched and exhibits good heat sealability, the latter measured by heat sealing two films together at 100°-200° C. for 3 seconds at about $10^5$ pascal, then measuring the force needed to peel the two films apart. For purposes of this invention, an acceptable heat seal requires a force greater than about 100 g/cm to pull apart the two films. This heat seal test is known in the art as the Suter test.

The coupling agents suitable for the practice of the subject invention fall into two general categories, titanate and silane coupling agents. The titanate coupling agents are more generally defined by one of the following formulas:

$(RO)_zTi(A)_x(B)_y$ or $(RO)Ti(OCOR')_p(OAr)_q$ wherein R is a monovalent alkyl, alkenyl, alkynyl, or aralkyl group having from 1 to 30 carbon atoms or substituted derivatives thereof; A is a thioaroxy, sulfonyl, sulfinyl, diester pyrophosphate, diester phosphate, or a substituted derivative thereof; OAr is aroxy; B is OCOR' or OAr; R' is hydrogen or a monovalent organic group having from 1 to 100 carbon atoms; x+y+z equal 4; p+g equal 3; x, z and q may be 1, 2 or 3; and y and p may be 0, 1 or 2. Examples of preferable titanate coupling agents comprise the following: isopropyl, triisostearoyl titanate; diisostearoyl, ethylene titanate; isopropyl trimethacryl titanate; titanium dimethacrylate, oxyacetate; isopropyl, triacryl titanate; titanium diacrylate, oxyacetate; isopropyl tricumylphenyl titanate; titanium di(cumylphenolate) oxyacetate; isopropyl, tri(N-ethylamino-ethylamino) titanate; isopropyl, tri(2-aminobenzoyl) titanate; isopropyl, tri(tetraethylenetriamine) titanate; isopropyl, tri(3-mercaptopropionyl) titanate; isopropyl triricinoyl titanate; isopropyl, tridodecylbenzenesulfonyl titanate; isopropyl, tri(dioctylphosphato) titanate; titanium di(dioctylphosphate) oxyacetate; di(dioctylphosphato)ethylene titanate; isopropyl tri(dioctylpyrophosphato) titanate; titanium di(-dioctylpyrophosphate) oxyacetate; di(dioctylpyrophosphato)ethylene titanate; tri(butyl, octyl pyrophosphato)isopropyl titanate; mono(dioctyl, hydrogen phosphite); titanium di(butyl, octyl pyrophosphate)di(dioctyl, hydrogen phosphite) oxyacetate; di(butyl, methyl pyrophosphato), isopropyl titanate mono(dioctyl, hydrogen) phosphite; di(butyl, methyl pyrophosphato)ethylene titanate mono(dioctyl, hydrogen phosphate); tetraisopropyl di(tridecylphosphito)titanate; tetraisopropyl, di(dioctylphosphito) titanate; tetraoctyloxytitanium di(ditridecylphosphite); and tetra(2,2-diallyloxymethyl-1 butoxy) titanium di(di-tridecyl) phosphite. For a more detailed discussion of these titanate coupling agents, reference can be made to U.S. Pat. No. 4,122,062 assigned to Kenrich Petrochemicals, Inc., Bayonne, N.J., herein incorporated by reference.

The silane coupling agents are generally defined by the formula $$YR-Si-(X)_3$$

where X represents a functional hydrolyzable group, typically alkoxy; Y represents a functional organic group such as amino, methacryloxy, or epoxy; and R is represented by an aliphatic linkage $(CH_2)_n$ where n is 0 to 3. Preferable examples of these silane coupling agents are: vinylbenzyl cationic silane having the chemical formula

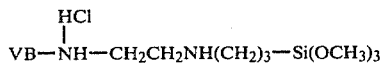

where VB is

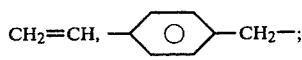

gamma-glycidoxypropyltrimethoxysilane having the chemical formula

gamma-mercaptopropyltrimethoxysilane having the chemical formula $$HSCH_2CH_2CH_2Si(OCH_3)_3;$$

beta-mercaptoethyltriethoxysilane having the chemical formula $$HSCH_2CH_2Si(OC_2H_5)_3;$$

gamma-chloropropyltrimethoxysilane having the chemical formula $$ClCH_2CH_2CH_2Si(OCH_3)_3;$$

N-beta-(aminoethyl)-gamma-aminopropyl-trimethoxysilane having the chemical formula

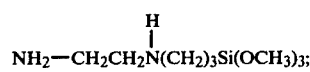

and gamma-aminopropyltriethoxysilane having the chemical formula $$NH_2CH_2CH_2CH_2Si(OC_2H_5)_3.$$

Other eligible silane coupling agents include vinyltriethoxysilane; vinyl-tris (beta-methoxy-ethoxy)silane; gamma-methacryloxypropyltrimethoxysilane; beta-(3,4-epoxycyclohexyl)ethyltrimethoxysilane; gamma-glycidoxypropyltrimethoxysilane; and vinyltriacetoxysilane. These bifunctional titanate and silane coupling agents exhibit a propensity to bond with both the surface of the film and with the mineral particulates.

To attach the coupling agent to the surface of the film, the film is contacted with an at least 0.2 percent solution of the coupling agent in an alcoholic solvent with which the coupling agent will not react, preferably isopropyl alcohol, at ambient temperatures for less than about one minute. The concentration of this solution can be as high as the saturation point. The contact time only need be long enough for interaction of the coupling agent with the film surface and is, due to the kinetics of the process, temperature dependent, i.e., the higher the temperature, the faster the reaction. Generally speaking, the contact time should be at least 5 seconds at a practical temperature of between 20° C. and 80° C. Upon removal of the film from the coupling agent bath, it is dried in any conventional manner.

Following the drying of the film, finely divided mineral particulates are bonded to the coupling agents on the film surface. This step may not be carried out in the same bath with the attachment of the coupling agent due to the bonding characteristics of the coupling agents themselves. The reactive functionalities on titanate and silane coupling agents have a greater attraction to mineral particulates than to the EVA film surface. If the coupling agents were in the presence of both the film and the minerals, they would react only with the minerals. Therefore, it is necessary to treat the surface of the EVA film with the coupling agent prior to introducing the film to the mineral slurry.

An exemplary list of finely divided mineral particulates which may be used in the practice of the subject invention comprise the following: "Minex" 7, aluminum silicate with mean particle size of 2.3 microns (micrometers), sold by Indusmin, Ltd. of Canada; Kaolin ASA LO with particle size below 2 microns, sold by Freeport Kaolin Co.; "Micro-White" 25, $CaCO_3$ with mean particle size 30 microns, sold by Sylacauga Calcium Products; Bentonite, described in the Fisher Scientific Company catalog #B-235; Imsil A-108, an amorphous silica with average particle size of 1.12 microns, sold by Illinois Mineral Co.; "Hi-Sil" 233, a hydrated amorphous silica with average particle size of 0.02 microns, sold by PPG Industries, Inc.; and "Super Pflex" 200, $CaCO_3$ with an average particle size of 0.5 microns, sold by Pfizer. However, any finely divided mineral particulate may be used as long as the particle size does not adversely affect the desired properties of the film, generally speaking, acceptable particle sizes being in the range of 0.1 to 150 microns.

These finley divided mineral particulates are bonded to the coupling agent on the surface of the film by treating the film with an at least 0.2 percent mineral particulate slurry in alcohol for at least about 5 seconds, or in any event, long enough for the mineral particulates to bond to the coupling agent. The concentration of the mineral slurry can be as high as the operability will allow, i.e., a free flowing and free draining slurry is required and the temperature can be anywhere in the range where the alcoholic medium remains a liquid. Practically speaking, this range will be between 20° C. and 80° C. The film is removed from the slurry, water washed and dried by any conventional means. The resulting film is elastomeric, heat sealable, transparent upon relaxation after being stretched and free of surface tack.

A more detailed understanding of the possible combinations of surface treatments of EVA film in the practice of the subject invention will be found in the examples that follow.

EXAMPLE 1

Ethylene vinyl acetate copolymer with a copolymerized vinyl acetate content of about 42 percent by weight and a melt index of about 55 g/10 min. (ASTM D-1238, 190° C.) was extruded into 4–5 mil film. Sheets of the film were treated at ambient temperature with 6 MR of high energy electron beam radiation. After the treatment, the sheets were submerged into a 2 percent solution of tetraisopropyl di(dioctyl phosphate) titanate (KR 41B, Kenrich Petrochemical, Inc.) in isopropyl alcohol at ambient temperature for 60 seconds. After removing the sheets from the bath, the excess liquid was shaken off and the sheets were dried at RT in a vacuum oven. The dried sheets then were submerged in 5 percent slurry of hydrated amorphous silica ("Hi-Sil" 233 by PPG) in isopropyl alcohol for 15 seconds. The treated sheets were water rinsed and dried overnight at RT in a vacuum oven. The resulting film displayed about 85 percent elastic recovery after 200 percent elongation, was heat sealable, transparent upon relaxation after being stretched and free of surface tack.

EXAMPLE 2

The same procedure as that of Example 1 was followed except that instead of submerging the film into a 2 percent solution of tetraisopropyl di(dioctyl phosphate) titanate in isopropyl alcohol, the film was submerged into a 2 percent solution of isopropyl, tri(dioctyl pyrophosphate) titanate (KR 38S, Kenrich Petrochemicals, Inc.) in isopropyl alcohol at ambient temperature for 60 seconds. Again, the resulting film was elastomeric, heat sealable, transparent upon relaxation after being stretched and free of surface tack.

EXAMPLE 3

The same procedure as that of Example 2 was followed except that instead of submerging the film in a 5 percent slurry of hydrated amorphous silica in isopropyl alcohol, the film was submerged in a 5 percent slurry of aluminum silicate ("Minex" 4 sold by Indus. Min., Ltd.) in isopropyl alcohol for 15 seconds. The resulting film displayed the same favorable physical characteristics as in Examples 1 and 2.

EXAMPLE 4

The same procedure as that of Example 3 was followed except that instead of submerging the film in a 5 percent slurry of aluminum silicate, the film was submerged in a 5 percent slurry of kaolin ("Kaopaque" 10 by Georgia Kaolin) in isopropyl alcohol for 15 seconds. Again, the resulting film displayed the same favorable characteristics as in the previous Examples.

Comparative Example

Ethylene vinyl acetate copolymer film with a copolymerized vinyl acetate content of about 42 percent by weight with a melt index of about 55 g/10 min (ASTM D-1238, 190° C.) was irradiated with 6 megarads of electron beam radiation. The film was contacted with a 5 percent slurry of "Micro-White" 25, a $CaCO_3$ mineral with mean particle size of 30 micrometers sold by Sylacanga Calcium Products, in methanol at room temperature for 35 seconds without a coupling agent being present. Upon drying, the film was free of surface tack but had lost its transparency.

A subsequent water washing rinsed the minerals off of the surface of the film, thus returning the tack to the film.

I claim:

1. A process for treating ethylene/vinyl acetate copolymer film containing about 35 to 50 percent copolymerized vinyl acetate by weight, said ethylene/vinyl acetate being crosslinked as a result of being subjected to a 0.5 to 16 megarad dosage of high energy radiation, comprising:
   (a) contacting the film with an alcoholic solution, at 20°–80° C., containing at least 0.2 percent of a coupling agent selected from the group consisting of titanate and silane coupling agents so that the coupling agent is bonded to the surface of the film; and then
   (b) contacting the film of (a) with an alcoholic slurry containing at least 0.2 percent finely divided mineral particulates so that the mineral particles are bonded to the coupling agent.

2. The process of claim 1 wherein the size of the minerals of (b) is from 0.1 to 150 microns.

3. The product of the process of claim 1.

4. The product of the process of claim 2.

* * * * *